(12) United States Patent
Li et al.

(10) Patent No.: US 10,345,964 B2
(45) Date of Patent: Jul. 9, 2019

(54) DISPLAY PANEL AND DISPLAY DEVICE

(71) Applicant: SHANGHAI TIANMA MICRO-ELECTRONICS CO., LTD., Shanghai (CN)

(72) Inventors: Jianxin Li, Shanghai (CN); Ping Feng, Shanghai (CN); Gengxiu Diao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 25 days.

(21) Appl. No.: 15/900,632

(22) Filed: Feb. 20, 2018

(65) Prior Publication Data

US 2019/0065001 A1 Feb. 28, 2019

(30) Foreign Application Priority Data

Aug. 31, 2017 (CN) .......................... 2017 1 0767638

(51) Int. Cl.
| | | |
|---|---|---|
| *G06F 3/042* | (2006.01) | |
| *G06F 3/041* | (2006.01) | |
| *G02F 1/1335* | (2006.01) | |
| *G02F 1/1333* | (2006.01) | |
| *G02F 1/1368* | (2006.01) | |

(52) U.S. Cl.
CPC ........ *G06F 3/0421* (2013.01); *G02F 1/13338* (2013.01); *G02F 1/133512* (2013.01); *G02F 1/133514* (2013.01); *G06F 3/0412* (2013.01); *G06F 3/0416* (2013.01);
(Continued)

(58) Field of Classification Search
CPC ........... G02F 1/03338; G02F 1/133512; G02F 1/133514; G02F 1/133528; G02F 2201/123; G06F 3/042; G06F 3/0421; G06F 3/0412; G06F 3/0416
See application file for complete search history.

(56) References Cited

U.S. PATENT DOCUMENTS

2009/0237365 A1* 9/2009 Choi .................... G02F 1/13338
 345/173
2013/0127766 A1* 5/2013 Zhao ..................... G06F 3/0412
 345/173

FOREIGN PATENT DOCUMENTS

| CN | 101216570 A | 7/2008 |
| CN | 104880842 A | 9/2015 |

* cited by examiner

*Primary Examiner* — Lisa S Landis
(74) *Attorney, Agent, or Firm* — Alston & Bird LLP

(57) ABSTRACT

Provided is a display panel including a first substrate, a second substrate placed opposite to the first substrate, and at least one detector placed between the first substrate and the second substrate; each of the at least one detector includes a photosensitive portion located at a side of the first substrate facing the second substrate, and an accommodation portion located between the photosensitive portion and the second substrate, the accommodation portion includes an accommodation space and an opening facing the photosensitive portion; when distance between the first and second substrates changes, an proportion of the photosensitive portion accommodated in the accommodation portion changes so that light received by the photosensitive portion changes; when the photosensitive portion senses change of the light received, a resistance value of the photosensitive portion changes, and then the photosensitive portion outputs a different sensing signal. Further provided is a display device containing the display panel.

20 Claims, 13 Drawing Sheets

(52) U.S. Cl.
CPC ...... *G02F 1/1368* (2013.01); *G02F 1/133528* (2013.01); *G02F 2201/123* (2013.01)

DISPLAY PANEL AND DISPLAY DEVICE

CROSS-REFERENCE TO RELATED APPLICATIONS

The present application claims priority to Chinese Patent Application No. 201710767638.1, filed on Aug. 31, 2017, the content of which is incorporated herein by reference in its entirety.

TECHNICAL FIELD

The present disclosure relates to the field of display techniques and, particularly relates to a display panel and a display device.

BACKGROUND

With the increasing of the multi-media devices, touch screens have drawn more and more concern. The touch screen, as the newest input device, has advantages of rugged design, durability, fast response, space saving, easy communication, etc. Using such techniques, a user can realize operation on the host by gently touching the display screen with a finger, so that man-machine interaction become more direct, which brings great convenience for people who are unfamiliar with computer operations.

According to the technical principles, the touch screen can be classified into the following basic types: pressure-sensitive touch screen, resistive touch screen, capacitive touch screen, surface acoustic wave touch screen, and photosensitive touch screen.

The photosensitive touch screen generally includes a light sensor capable of detecting environment light. When a user touches a certain area using a finger or a writing tool such as pen, the detected result of the amount of light in the touch area obtained by using a light sensing needle corresponding to the touch area may vary due to blocking of the fingers. A processor in turn determines the area touched according to variation of the detected result of the amount of light detected by the light sensor (i.e., the light sensing needle), and then outputs positioning result. A hand is not necessary for controlling the photosensitive touch screen, and the writing tool such as pen and so on is also sufficient for operation even when operated with a glove.

However, it has been found in research that, when the environment light is weak, variation of the detected result of the amount of light obtained by the light sensor before and after the touch is not significant, and a detector cannot detect the touch position even if the user has touched the screen.

In view of this, it is necessary to improve the existing photosensitive touch screen, so as to improve sensitivity of the photosensitive touch screen.

SUMMARY

In view of the above, the present disclosure provides a display panel, including: a first substrate, a second substrate placed opposite to the first substrate, and at least one detector placed between the first substrate and the second substrate. Each of the at least one detector includes a photosensitive portion and an accommodation portion. The photosensitive portion is located at a side of the first substrate facing the second substrate, the accommodation portion is located between the photosensitive portion and the second substrate, and the accommodation portion includes an accommodation space and an opening facing the photosensitive portion. In an instance in which the distance between the first substrate and the second substrate changes, a proportion of the photosensitive portion accommodated in the accommodation portion changes so that light received by the photosensitive portion changes; and in an instance in which the photosensitive portion senses a change of the received light, a resistance value of the photosensitive portion changes, and the photosensitive portion outputs a different sensing signal.

The present disclosure further provides a display device, including the display panel as described above.

DESCRIPTION OF EMBODIMENTS

Figure 1:
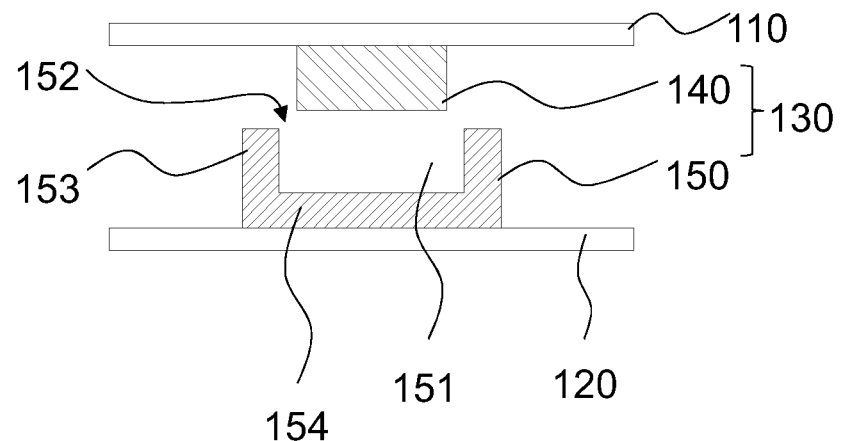
FIG. 1 illustrates a sectional view of a display panel in a non-touch state according to an embodiment of the present disclosure.

The present disclosure will be further described with reference to the drawings and embodiments, so as to better understand the features, purposes and advantages of the present disclosure.

It should be interpreted that the details described below are used to fully understand the present disclosure, the present disclosure can be implemented in many other manners other than the manners described herein, and those skilled in the art can still obtain other embodiments based on the description below without departing from the principles of the present disclosure. That is, the present disclosure is not limited to the specific embodiments described below.

Terms used in the embodiments of the present disclosure are merely used to describe the specific embodiments, rather than to limit the present disclosure. The expressions "a", "an" and "the" in a singular form used in the embodiments and the attached claims of the present disclosure shall include plural forms thereof, unless otherwise noted.

It should be noted that the orientation words "on", "below", "left", "right" are described based on the angle shown in the drawings, and not used to limit the embodiments of the present disclosure. In the context, when it is mentioned that an element is formed on or below another element, the element can be not only directly formed on another element, but also indirectly formed on the another element by an intermediate element.

The embodiments below are merely exemplary, and the exemplary embodiment can be implemented in various manners except the described one(s) in the present disclosure. A same number in the drawings denotes a same or similar structure without repeated description. The used expressions related to position and orientation are all described based on the drawings, otherwise changed according to actual needs, and all the changes made should fall into the protection scope of the present disclosure. It should be noted, thicknesses of some portions shown in the drawings are not representing the actual thicknesses but exaggerated for facilitating understanding. Without contradiction, the embodiments and the features in the embodiments can be combined.

Embodiments of the present disclosure provide a display panel, including a first substrate, a second substrate opposite to the first substrate, and at least one detector placed between the first substrate and the second substrate. The detector includes a photosensitive portion and an accommodation portion. The photosensitive portion is placed at a side of the first substrate facing to the second substrate; the accommodation portion is placed between the photosensitive portion and the second substrate, the accommodation portion includes an accommodation space and an opening, and the opening faces the photosensitive portion. When a distance between the first substrate and the second substrate changes, a proportion of the photosensitive portion accommodated in the accommodation portion changes, so that the amount of light received by the photosensitive portion changes accordingly; the photosensitive portion changes its own resistance value by sensing the change of the amount of light received, and outputs different sensing signals. A user's touch operation changes the proportion of the photosensitive portion accommodated in the accommodation portion, and the resistance value of the photosensitive portion changes accordingly, so that the sensing signal output by the photosensitive portion before the resistance value changes is different from the sensing signal output by the photosensitive portion after the resistance value changes. Therefore, whether the user has conducted a touch operation can be judged by determining whether the sensing signal output by the photosensitive portion is changed.

FIG. 1 illustrates a sectional view of a display panel in a non-touch state according to an embodiment of the present disclosure. The section shown in FIG. 1 is a section of the display panel perpendicular to a plane where the display panel is. As shown in FIG. 1, the display panel 100 includes a first substrate 110 and a second substrate 120. The display panel can be a liquid crystal display panel. A main structure of the liquid crystal display panel includes an array substrate, a color film substrate aligned to the array substrate, a liquid crystal layer placed between the array substrate and the color film substrate, an array orientation film placed at an internal side of the array substrate facing the liquid crystal layer, a color film orientation film placed at a side of the color film substrate facing the liquid crystal layer, an array polarizer placed at a side of the array substrate away from the liquid crystal layer, a reflection film placed at a side of the array polarizer away from the liquid crystal layer, and a color film polarizer placed at a side of the color film substrate away from the liquid crystal layer. The color film substrate includes a color film base substrate, a black matrix placed on the color film base substrate, a color resin placed at a side of the black matrix away from the color film base substrate, and a planarization layer placed at a side of the color resin away from the color film base substrate. The array substrate includes an array base substrate, a thin film transistor placed at a side of the array base substrate, a pixel electrode placed at a side of the thin film transistor away from the array base substrate, and a planarization layer placed at a side of the pixel electrode away from the array base substrate. Other conventional film layers that should be included in the liquid crystal display panel are not repeated herein. Optionally, the display panel can also be an organic light-emitting diode display panel in some other embodiment of the present disclosure.

Optionally, the first substrate 110 is parallel to the second substrate 120, and both the first substrate 110 and the second substrate 120 are parallel to a plane where the display panel 100 is located. The first substrate 110 and the second substrate 120 can be substrates having supporting function, for example, glass substrate, plastic substrate, flexible substrate, etc., or be substrates formed by multiple laminated material layers.

The first substrate and the second substrate can also be placed in any film layer in the display panel, for example, at the external surface of the display panel; or, the first substrate and the second substrate are placed at a side of the display panel wherein a light output unit thereof is located. The light output unit can be a light guide plate, which can protect the detector from interference from other film layers in the display panel, thereby facilitating the detector to detect variation of the light where the detector is located.

It should be understood that, the first substrate and the second substrate can also be integrated into other film layer in the display panel, i.e., in the same layer as other film layers in the display panel, forming a multiplexed film layer or a multiplexed substrate, so as to reduce production cost, simplify production process, and reduce a thickness of the display panel. For example, it can be arranged that: the first substrate is the color film substrate, and the second substrate is the array substrate; or, the first substrate is the array substrate, and the second substrate is the color film substrate.

The display panel 100 further includes a detector 130. A certain space is formed between the first substrate 110 and the second substrate 120, and the detector 130 is placed between the first substrate 110 and the second substrate 120.

The detector 130 includes a photosensitive portion 140 and an accommodation portion 150. The photosensitive portion 140 is placed at a side of the first substrate 110 facing the second substrate 120. The accommodation portion 150 is placed between the photosensitive portion 140 and the second substrate 120. The accommodation portion 150 includes an accommodation space 151 and an opening 152, and the opening 152 is orientated toward the photosensitive portion 140.

Optionally, the accommodation portion 150 includes a sidewall 153 extending toward the first substrate 110 and a bottom surface 154 connected with the sidewall 153, and the bottom surface 154 and the sidewall 153 cooperatively form the accommodation space 151. Both the bottom surface 154 and the sidewall 153 are made of light shading material. The accommodation portion 150 is located on a surface of the second substrate 120. The bottom surface 154 of the accommodation portion 150 is connected with the second substrate 150.

Optionally, the bottom surface 154 and the sidewall 153 are integrally formed. Both the bottom surface 154 and the sidewall 153 are formed by resin material.

The photosensitive portion can be a photosensitive resistor. For example, a resistance value of the photosensitive portion changes according to variation of intensity of incident light. Optionally, the photosensitive resistor includes amorphous silicon (i.e., a-Si). When the incident light has a high intensity, the resistance value of the photosensitive resistor decreases; when the incident light has a low intensity, the resistance value of the photosensitive resistor increases.

FIG. 1 illustrates, in a non-touch state, a position relation of the first substrate 110, the second substrate 120, and the detector 130 in the display panel 100. In the non-touch state, at least a part of the photosensitive portion 140 of the detector 130 is placed outside the accommodation space 151 of the accommodation portion 150.

Figure 2:
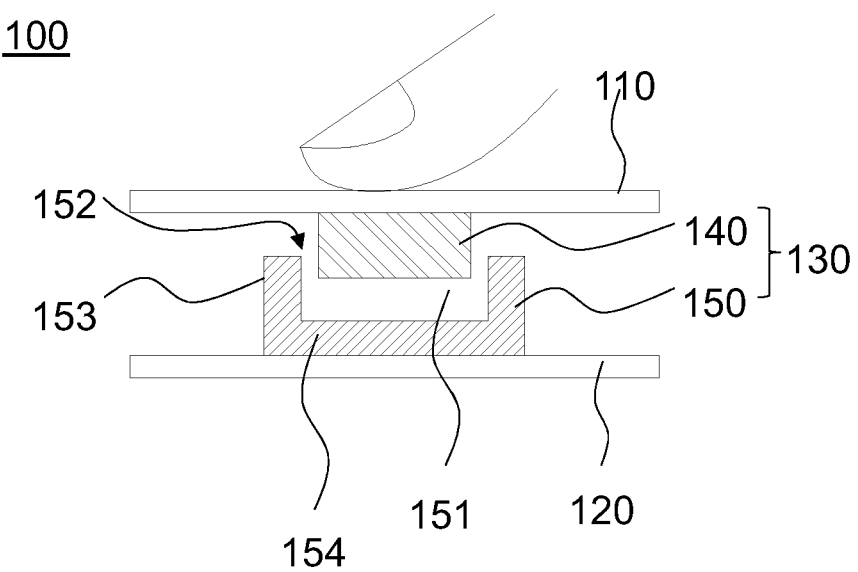
FIG. 2 illustrates a sectional view of a display panel in a touch state according to another embodiment of the present disclosure.

FIG. 2 illustrates a sectional view of a display panel in a touch state according to another embodiment of the present disclosure. The section in FIG. 2 is in the same direction as the section in FIG. 1. The reference signs used in the present embodiment are identical to those used in the embodiment above. Besides, the sectional views corresponding to the following respective embodiments are shown in the same direction as the sectional view corresponding to the embodiment above, and the reference signs used are also identical to those used above, which are not repeated herein. As shown in FIG. 2, when touch happens at a touch position, a distance between the first substrate 110 and the second substrate 120 at the touch position changes, a proportion of the photosensitive portion 140 accommodated in the accommodation portion 150 changes accordingly. Specifically, when the display panel 100 is pressed at the touch position, the first substrate 110 and the second substrate 120 get closer to each other, which drives the photosensitive portion 140 and the accommodation portion 150 of the detector 130 to respectively move toward each other. Since the opening 152 of the accommodation portion 150 is arranged to face the photosensitive portion 140, the photosensitive portion 140 can pass through the opening 152 into the accommodation space 151 of the accommodation portion 150. As the distance between the first substrate 110 and the second substrate 120 decreases, the proportion of the photosensitive portion 120 accommodated in the accommodation portion 150 increases.

FIG. 2 illustrates, in a touch state, a position relation of the first substrate 110, the second substrate 120, and the detector 130 in the display panel. In the touch state, a part of the photosensitive portion 140 of the detector 130 is received in the accommodation space 151 of the accommodation portion 150.

When touch happens, positions of the first substrate and the second substrate change due to pressing, and position relation between the photosensitive portion and the accommodation portion changes accordingly. The position relation between the photosensitive portion and the accommodation portion in the non-touch state is different from the position relation between the photosensitive portion and the accommodation portion in the non-touch state in the touch state, therefore, the amount of light received by the photosensitive portion before the touch operation is different from the amount of light received by the photosensitive portion after the touch operation, resulting change of resistance value of the photosensitive portion. Further, the sensing signal output by the photosensitive portion before the touch operation is also different from the sensing signal output by the photosensitive portion after the touch operation.

For example, as shown in FIG. 1 and FIG. 2, the accommodation portion 150 is made of light-proof material, such that, in a touch state, the photosensitive portion 140 received in the accommodation space 151 can hardly receive the light, that is, the amount of light received by the photosensitive portion 140 in the touch state is reduced as compared with that in the non-touch state. The photosensitive portion 140 changes its resistance value when sensing such change of light, and outputs a sensing signal different from that in the non-touch state. It can be understood that, the light in the present embodiment can come from environment light outside the display panel, or be light incident from a light source of the display panel, or be a combination of the environment light and the light incident from the light source of the display panel.

In the present embodiment, in the non-touch state, a part of the photosensitive portion is outside the accommodation space of the accommodation portion, and the remaining part of the photosensitive portion is received in the accommodation space of the accommodation portion. When touch happens, the proportion of the photosensitive portion accommodated in the accommodation portion gradually increases with the decrease of the distance between the first substrate and the second substrate. The part of the photosensitive portion received in the accommodation space is larger (in surface area or in volume) in the touch state than in the non-touch state. It should be understood that, in other embodiments, in the non-touch state, the whole photosensitive portion can be located outside the accommodation space of the accommodation portion.

When the external environment light is weak, variation of the amount of light detected by the light sensor before a finger touch and during a finger touch is not significant, such that the detector cannot detect the touch position even if the user has conducted a touch operation. When touch happens, the proportion of the photosensitive portion accommodated in the accommodation portion changes, and the amount of light received by the photosensitive portion changes accordingly. The accommodation portion amplifies the variation of light at the position where the photosensitive portion is located. As for the photosensitive portion, when touch happens, the accommodation portion plays a modification function on the amount of light incident from a plurality of directions, such that the photosensitive portion can detect variation of light in the plurality of directions. Therefore, change of light in a single direction is amplified into change of light in a plurality of directions, thereby improving detection accuracy and sensitivity of the detector.

At the same time, when a user touches a certain touch area with a finger, the touch area will surely be shaded, and light at the touch area will change accordingly. Position of the touch area is determined according to variation of the amount of light detected by the light sensor corresponding to the touch area, and then a position result is output. However, during touch, the finger or writing tool such as pen will shade the display picture and influence user's watching experience.

By using the display panel provided by the present disclosure, when a user makes a touch, a touch pressure changes the distance between the first substrate and the second substrate, and the proportion of the photosensitive portion accommodated in the accommodation portion changes accordingly, thereby changing the amount of light received by the photosensitive portion. The display panel can be touched by a transparent touch tool, and thus the display picture will not be shaded during touch, especially, when the user clicks some small icons, the icons clicked will not be shaded by the writing tool, and the user can see whether the clicked position is right when clicking the icon, thereby avoiding operation mistake.

Figure 3:
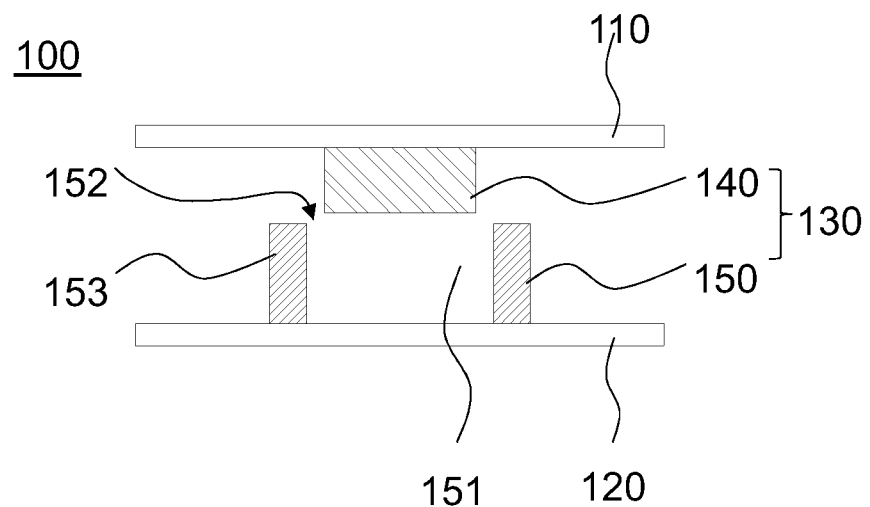
FIG. 3 illustrates a sectional view of a display panel according to still another embodiment of the present disclosure.

Optionally, as shown in FIG. 3, FIG. 3 illustrates a sectional view of a display panel according to still another embodiment of the present disclosure. In FIG. 3, the direction of the section is the same as in the above embodiments, and the same arrangements as in the above embodiments are not repeated herein. The differences include: the accommodation portion 150 is placed on a surface of the second substrate 120, the second substrate 120 and the sidewall 153 cooperatively form the accommodation space, and there is no need to provide additional bottom surface for the accommodation portion 150, so as to simplify the manufacturing process and reducing the cost.

It should be noted that, in order to clearly illustrate the detector, the present embodiment shown in FIG. 3 only shows one detector, however, the number of the detector in the display panel of the present embodiment is not limited to one, and can be any value according to actual specific embodiments and demands on the product.

In some optional embodiments, the first substrate and the second substrate can be placed close to a light emitting source in the display panel. As such, light received by the photosensitive portion is mainly light emitted from a back-light source of the display panel, and the light emitted from the back-light source is stable and will not change as the environment light which changes according to external conditions, so that the detection result will be more accurate.

Optionally, the display panel includes a pattern formed by a light-shading material. The light-shading material is placed at a side of the detector facing a light emission surface of the display panel, or the light-shading pattern is formed on a side of one of the first substrate and the second substrate closer to the light emission surface. An orthographic projection of the detector in a direction perpendicular to a plane where the display panel is located falls into the area where the light-shading material is located. In this case, the environment light is shaded by the light-shading material, the light received by the photosensitive portion only comes from the light emitted from the back-light source of the display panel, and the change of the incident light that can be detected by the photosensitive portion is only realized by the accommodation portion, thereby improving detection accuracy.

It can be understandable that when a touch tool such as a finger, a pen and so on gets close to the display panel but have not touched the display panel yet, the environment light at a position of the display panel close to the touch tool is shaded, and the result detected by the light sensor may also change greatly, and, at this time, the device may wrongly determine that the user has made a touch operation, and a misinformation appears. According to the present embodiment of the present disclosure, the light received by the photosensitive portion is mainly provided by the light source in the display panel, i.e., provided by the back-light source in the liquid crystal display panel, which is more stable than the environment light and thus can avoid misinformation.

In some optional embodiment, the display panel 100 has a first state and a second state.

Figure 4:
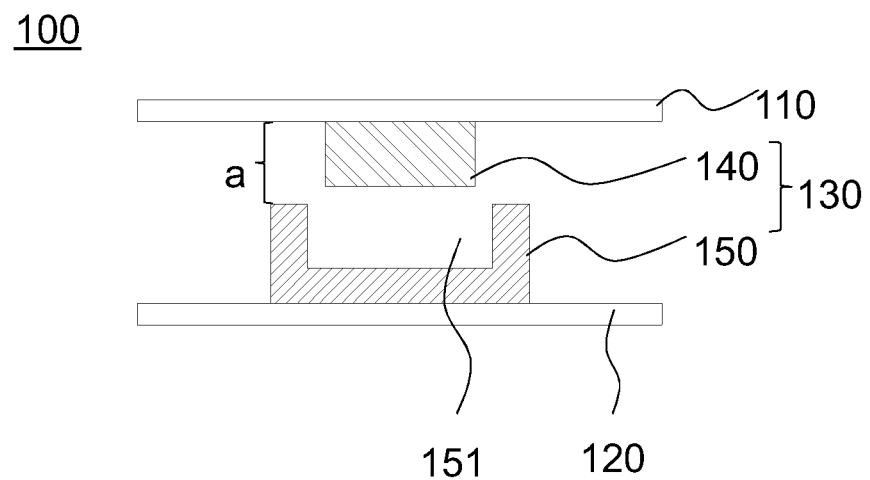
FIG. 4 illustrates a sectional view of a display panel in a first state according to still another embodiment of the present disclosure.

As shown in FIG. 4, which illustrates a sectional view of a display panel in a first state according to still another embodiment of the present disclosure, the display panel 100 is in a untouched state, the first substrate 110 and the second substrate 120 are not subjected to an external force and no deformation thereof occurs, the smallest distance between the accommodation portion 150 and the first substrate 110 is referred to as first distance a, and the photosensitive portion 140 is located at least partially outside the accommodation space 151, at this time, a resistance value of the photosensitive portion is referred to as first resistance value r1.

When touching, with decrease of the distance between the first substrate 110 and the second substrate 120, the proportion of the photosensitive portion 140 accommodated in the accommodation portion 150 becomes greater and greater.

Figure 5:
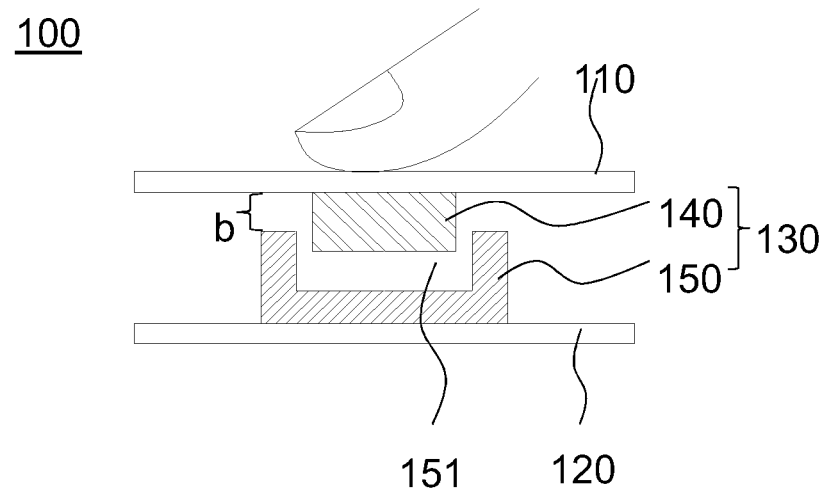
FIG. 5 illustrates a sectional view of a display panel in a second state according to still another embodiment of the present disclosure.

As shown in FIG. 5, which illustrates a sectional view of a display panel in a second state according to still another embodiment of the present disclosure, the display panel 100 is in a touched state, the smallest distance between the accommodation portion 150 and the first substrate 110 is referred to as second distance b, and the first distance a is greater than the second distance b, at this time, the proportion of the photosensitive portion 140 accommodated in the accommodation space 151 is greater than the accommodation proportion in the first state. That is, in the second state, a portion (surface area or volume) of the photosensitive portion 140 accommodated in the accommodation space 151 in the second state is greater than that in the first state, the amount of light received by the photosensitive portion 130 changes (decreases), and the resistance value of the photosensitive portion 140 change to be the second resistance value r2. The first resistance value r1 is not equal to the second resistance value r2.

Figure 6:
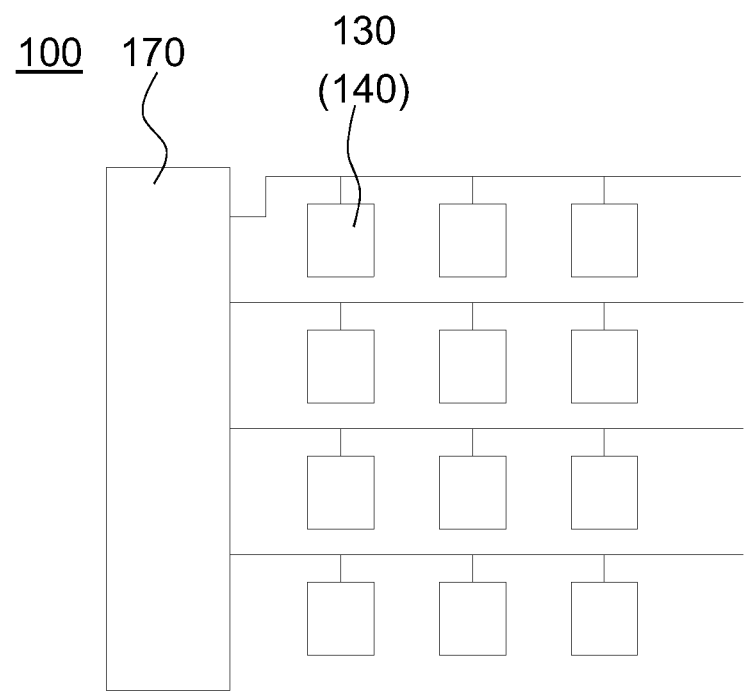
FIG. 6 illustrates a partial schematic top view of a display panel according to still another embodiment of the present disclosure.

FIG. 6 illustrates a partial schematic top view of a display panel according to still another embodiment of the present disclosure.

As shown FIG. 6, the display panel 100 further includes a controller 170. Optionally, the controller 170 is a control chip. The controller 170 can be located on a flexible circuit board (not shown in the drawings) of the display panel 100, and the controller 170 is electrically connected with the detector 130 by a wiring. In some other optional embodiments, each detector is connected with the controller by one separate wiring and is independently controlled by the controller.

The controller 170 is used for providing an input signal for the detector 130, receiving an output signal of the detector 130, and providing the touch position according to the output signal provided by the detector 130. When the output signal provided by the detector 130 is a first output signal, the controller 170 determines that the display panel 100 is in the untouched state; when the output signal provided by the detector 130 is a second output signal, the controller 170 determines that the display panel 100 is in a touch state, and the position where the detector 130 whose second output signal is the second output signal is located is the touch point.

Further, the controller 170 can output a control signal to the display panel 100 such that the display panel 100 can present a corresponding display.

Optionally, the first output signal is an output signal provided by the detector 130 (or the photosensitive portion 140) when the resistance value of the photosensitive portion 140 is the first resistance value; and the second output signal is an output signal provided by the detector 130 when the resistance value of the photosensitive portion 140 becomes the second resistance value.

Further, the resistance value of the photosensitive portion monotonically changes according to the intensity of light: when the first resistance value is greater than the second resistance value, the second output signal is an output signal provided by the detector when the resistance value of the photosensitive portion is smaller than the second resistance value; when the first resistance value is smaller than the second resistance value, the second output signal is an output signal provided by the detector when the resistance value of the photosensitive portion is greater than the second resistance value.

It can be understood that, when a touch tool such as a finger, a pen and so on gets close to the display panel but the user has not performed a touch operation yet, the environment light is shaded at a position on the display panel close to the touch tool, and the result detected by the light sensor may also change greatly, and, at this time, the device may wrongly determine that the user has performed a touch operation, and a misinformation appears.

By the display panel provided by the present disclosure, the accommodation portion amplifies the change of the light at the position where the photosensitive portion is located. As such, even if the environment light changes greatly, or the finger is close to the display panel but does not touch the display panel, and the proportion of the photosensitive portion accommodated in the accommodation portion does not change, the change degree of the resistance value of the photosensitive portion cannot reach a change degree of the resistance value when a touch actually happens, and thus sensing signal correspondingly output by the photosensitive portion is different from the sensing signal output by the photosensitive portion when the touch actually happens, so that the display panel will not make a wrong judgment, thereby improving detection accuracy and sensitivity and effectively avoiding misinformation of the touch point.

Figure 7:
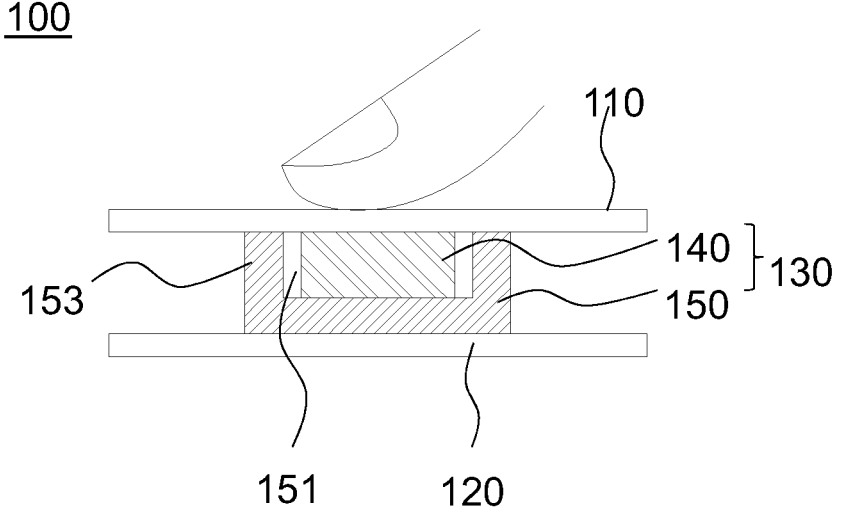
FIG. 7 illustrates a sectional view of a display panel in a second state according to still another embodiment of the present disclosure.

In some optional embodiments, as shown in FIG. 7, which illustrates a sectional view of a display panel in a second state according to still another embodiment of the present disclosure, the same configurations as in the previous embodiments are not repeated herein. The differences includes, in the second state, the photosensitive portion 140 is completely accommodated in the accommodation space 151, the minimum distance (the second distance) between the accommodation portion 150 and the first substrate 110 is zero, and the accommodation portion 150 can contact the first substrate 110.

The accommodation portion 150 includes a sidewall 153 extending toward the first substrate 110, an orthographic projection of the sidewall 153 on the first substrate 110 surrounds the photosensitive portion 130. An end of the sidewall 153 facing the first substrate 110 forms the opening. The sidewall 153 of the accommodation portion 150 contacts the first substrate 110, the accommodation portion 150 and the first substrate 110 cooperatively define a closed space, such that no light is incident on the photosensitive portion 130 in the second state. As such, the change of light sensed by the photosensitive portion 130 is maximized, and at this time, the second resistance value r2 of the photosensitive portion 130 is an endpoint value that the photosensitive portion 130 can reach in the display panel 100. A difference between the first resistance value r1 and the second resistance value r2 is a maximum difference, thereby making the detected result more significant. It is impossible to eliminate the light that can be received by the photosensitive portion by merely shading light at a single side of the photosensitive portion, and comparatively, the present embodiment can have more accurate detection results.

Figure 8:
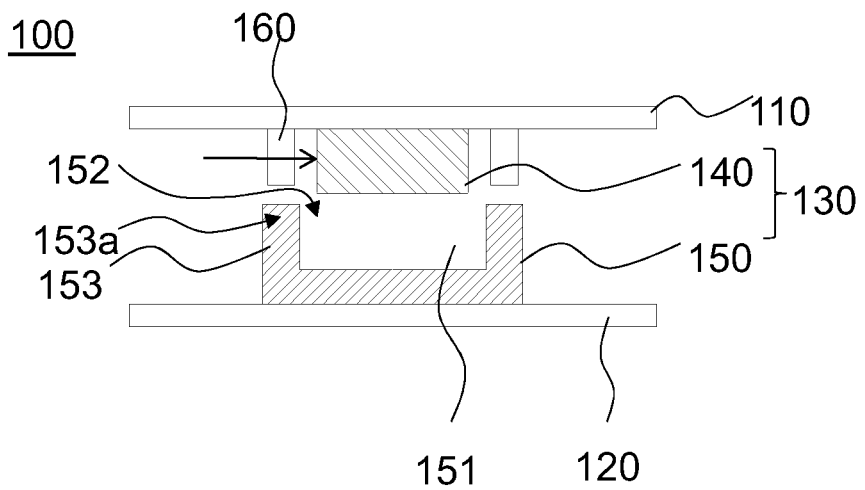
FIG. 8 illustrates a sectional view of a display panel in a non-touch state according to still another embodiment of the present disclosure.
Figure 9:
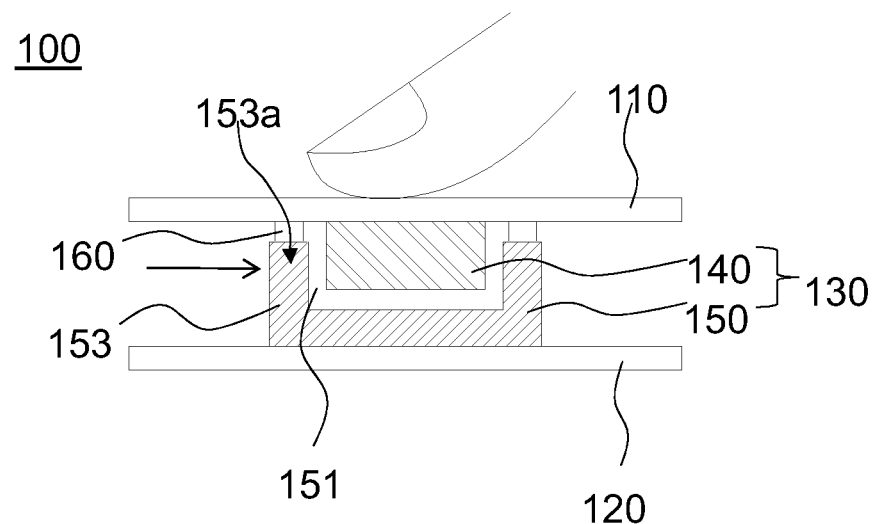
FIG. 9 illustrates a sectional view of a display panel in a touch state according to still another embodiment of the present disclosure.

In some optional embodiments, as shown in FIGS. 8 and 9, which illustrates the display panel according to still another embodiment of the present disclosure, the arrows in the figures schematically show the light, and the same configurations as in the previous embodiments are not repeated herein.

As shown in FIG. 8, which illustrates a sectional view of a display panel in a non-touch state according to still another embodiment of the present disclosure, the detector 130 further includes a first elastic wall 160 arranged at a side of the first substrate 110 facing the second substrate 120 and surrounding the photosensitive portion 140.

Optionally, the first elastic wall 160 is arranged at a side of the first substrate 110 facing the second substrate 120 and extending along a direction perpendicular to the first substrate toward the second substrate 120. The sidewall 153 of the accommodation portion 150 includes a first end 153a, and the first end 153a is an end of the sidewall 151 facing the first substrate 110, such that the first end 153a forms the opening 152 of the accommodation portion 150. An orthographic projection of the first end 153a of the sidewall 153 on the first substrate 110 overlaps with an orthographic projection of the first elastic wall 160 on the first substrate 110.

The accommodation portion 150 is made of a light-shading material, the first elastic wall 160 is made of an elastic light-transmitting material, and the first elastic wall 160 can be made of an elastic resin material. Thus, light can go through the first elastic wall 160 to the photosensitive portion 140; when touch happens, the distance between the first substrate 110 and the second substrate 120 changes, and the sidewall 153 compresses the first elastic wall 160 and changes the accommodation proportion of the photosensitive portion 140 in the accommodation portion 150, such that the light at the position where the photosensitive portion 140 is located changes.

As shown in FIG. 9, which illustrates a sectional view of a display panel in a touch state (or the touched state or the second state) according to still another embodiment of the present disclosure, the sidewall 153 of the accommodation portion 150 compresses the first elastic wall 160, the light that could have gone through the first elastic wall 160 to the photosensitive portion 140 in a non-touch state is shaded by the accommodation portion 150 in the touch state. The light at the position where the photosensitive portion 140 is located changes, and thus the resistance value of the photosensitive portion 140 changes, so that the photosensitive portion 140 outputs a sensing signal different from the sensing signal in the non-touch state, thereby judging the touch point and then realizing the touch operation by the controller.

In the present embodiment, when the user is conducting a touch operation, the force during touch changes the distance between the first substrate and the second substrate so as to change the proportion of the photosensitive portion accommodated in the accommodation portion, such that the light received by the photosensitive portion changes. The accommodation portion amplifies the change of the light at the position where the photosensitive portion is located, which improves the detection sensitivity of the detector.

Besides, by setting the first elastic wall, the distance between the first substrate and the second substrate decreases during pressing, the accommodation proportion of the photosensitive portion in the accommodation portion increases, the sidewall the accommodation portion accordingly compresses the first elastic wall. The first elastic wall can play a certain buffer role, improve anti-extrusion capability of the display panel, avoid direct collision of the sidewall of the accommodation portion onto the first substrate, and avoid damage to the substrate during pressing.

Optionally, when the first substrate is a color film substrate and the second substrate is an array substrate, or the first substrate is an array substrate and the second substrate is a color film substrate, the display panel further includes a plurality of support posts placed between the array substrate and the color film substrate. At least one of the detectors between the first substrate and the second substrate is also used as the support post, or in other words, detectors are placed on the positions of some of the support posts to replace the corresponding support posts, thereby reducing the space occupied by the detectors; at the same time, the first elastic wall plays a certain buffer role and improves the anti-extrusion capability of the display panel, thereby avoiding direct contact, collision or friction between the first end of the sidewall of the accommodation portion and the substrate, or damage to a functional film on the surface of the substrate. It should be noted that, the accommodation portion and the support posts can be located in a same layer, made of a same material, or made in the single process, so as to reduce the space occupied by the detectors and simplify the making process.

Optionally, when the detectors are placed in a liquid crystal box, the accommodation portion and the photosensitive portion are located on the array substrate and the color film substrate, respectively. An alignment layer is placed on a side of the array substrate facing the liquid crystal layer, and a further alignment film is placed on a side of the color film substrate facing the liquid crystal layer. The alignment layer may be a polyimide film. The first elastic wall and the photosensitive portion are placed on a same substrate.

Spaced by the first elastic wall, when touch happens, the accommodation portion will not directly contact the array substrate or the color film substrate such that no collision or friction will happen to the alignment layer on the array substrate or the color film substrate, thereby avoiding damage to the alignment layers. Optionally, as shown in FIG. 9, an orthographic projection of the first elastic wall 160 on the first substrate 110 falls in to an orthographic projection of the first end 153a of the sidewall 153 on the first substrate 110. That is to say, when the sidewall 153 compresses the first elastic wall 160 in the touch state, the end of the first elastic wall 160 facing the second substrate 120 fully contact a first end 153a of the sidewall 153, such that the end of the first elastic wall 160 facing the second substrate 120 bears more uniform force and different sections of the first elastic wall 160 are compressed to a same extent, while avoiding misalignment during pressing, local crimp of the first elastic wall 160, and influence to detection of the detector 130.

In some optional embodiments, the sidewall of the accommodation portion includes a first end facing the first substrate, and the first end includes an end surface parallel to the first substrate. That is to say, in the touch state, when the sidewall compresses the first elastic wall, the end of the first elastic wall facing the second substrate bears more uniform force and different sections of the first elastic wall are compressed to a same extent, thereby avoiding misalignment during pressing; or in the touch state, when the end surface the first end of the accommodation portion contacts the first substrate, the accommodation portion can surface-contact the first substrate to form a closed space, and the contact between the first end and the first substrate reduces the pressure at the contact position.

Figure 10:
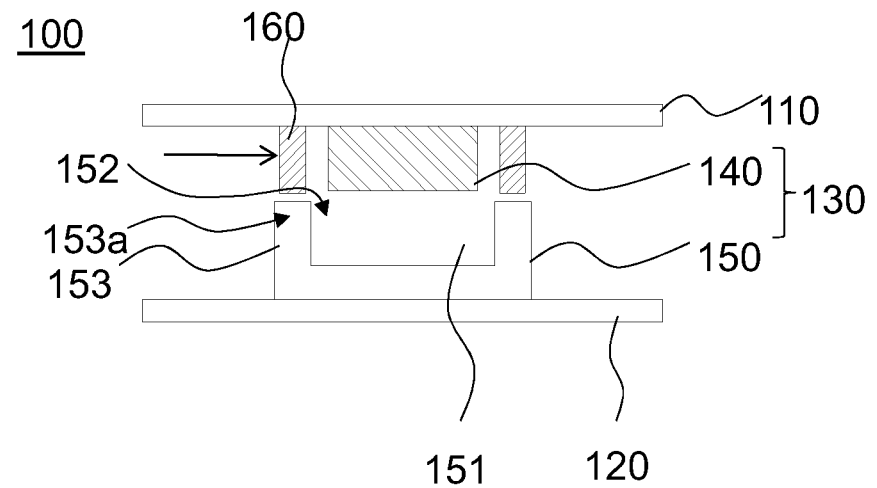
FIG. 10 illustrates a sectional view of a display panel in a non-touch state according to still another embodiment of the present disclosure.
Figure 11:
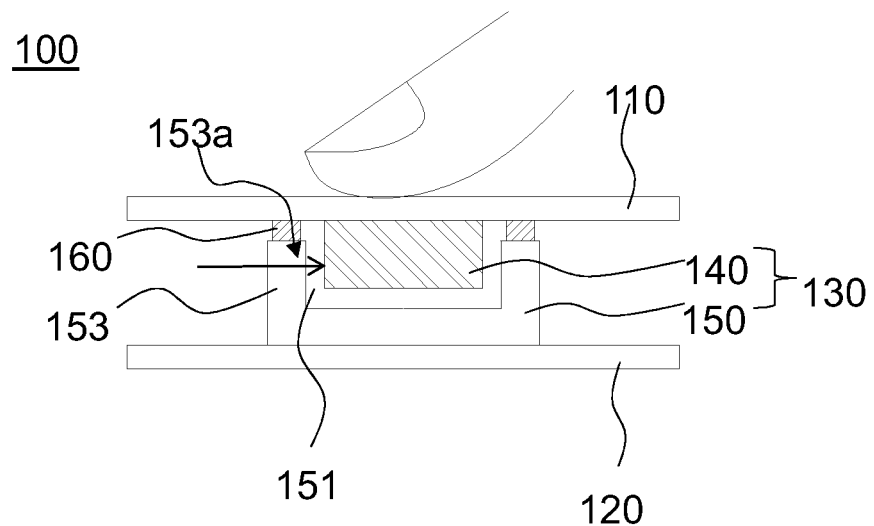
FIG. 11 illustrates a sectional view of a display panel in a touch state according to still another embodiment of the present disclosure.

In some optional embodiments, as shown in FIG. 10 and FIG. 11, which illustrate sectional views of a display panel according to still other embodiments of the present disclosure, arrows shown in the figures schematically show the light, and the same configurations as described above are not repeated herein.

The differences lie in that the accommodation portion 150 is made of a light-transmitting material and the first elastic wall 160 is made of a light-shading material.

FIG. 10 illustrates a sectional view of the display panel in a non-touch state. At this time, since the first elastic wall 160 is made of a light-shading material and the first elastic wall 160 surrounds the photosensitive portion 140, the light is shaded by the first elastic wall 160.

When touch happens, the distance between the first substrate 110 and the second substrate 120 changes, the sidewall 153 compresses the first elastic wall 160 and changes the proportion of the photosensitive portion 140 accommodated in the accommodation portion 150, thereby changing the light at the position where the photosensitive portion 140 is located.

FIG. 11 illustrates a sectional view of the display panel in a touch state. As shown in FIG. 11, the sidewall 153 of the accommodation portion 150 compresses the first elastic wall 160, the light that could have been shaded by the first elastic wall 160 in the non-touch state goes through the accommodation portion 150 and is incident on the photosensitive portion 140 in a touch state. Thus, as light at the position where the photosensitive portion 140 is located changes, the resistance value of the photosensitive portion 140 changes, such that the photosensitive portion 140 outputs a different sensing signal from the sensing signal in the non-touch state, thereby determining the touch point and realizing the touch operation of the controller.

When external environment light is relatively weak, an amount of light detected by the light sensor before a finger touch and during a finger touch does not vary significantly, and the detection device cannot detect the touch even if a touch operation has been conducted. When touch happens, the proportion of the photosensitive portion accommodated in the accommodation portion changes so that the light received by the photosensitive portion changes. The accommodation portion plays a role of amplifying the change of the light at the position where the photosensitive portion is located.

Besides, compared with a conventional photosensitive touch screen, the display panel provided by the present embodiment has an opposite detection manner. When pressing happens, the photosensitive portion will receive more light. That is to say, the photosensitive portion receives more light than that in the non-touch state. Therefore, when the environment light is shaded and no pressing happens (for example, when a touch tool such as a finger or a pen gets close to the display panel but the user does not touch the display panel), the detector will not output a signal corresponding to a situation when a touch happens, thereby avoiding misinformation.

In some optional embodiments, the first substrate is a color film substrate and the second substrate is an array substrate. The accommodation portion is made of a light-transmitting material and the first elastic wall is made of a light-shading material. In different optional embodiments, the first substrate is an array substrate and the second substrate is a color film substrate, which is not repeated herein. Optionally, the accommodation portion is made of a same material as a planarization layer in the array substrate or the color film substrate, and can be made in a same layer where the planarization layer in the array substrate or the color film substrate is located, and the accommodation portion and the planarization can be integrally formed.

Figure 12:
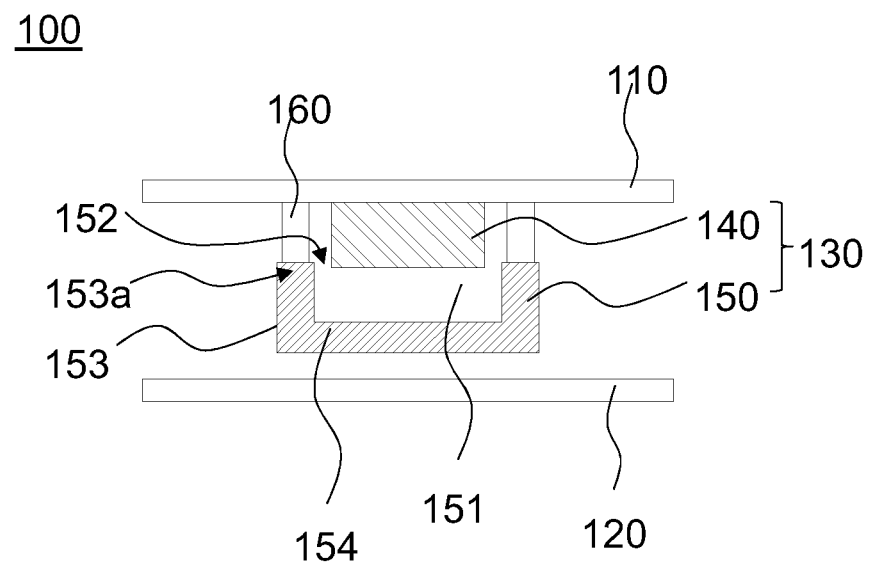
FIG. 12 illustrates a sectional view of a display panel according to still another embodiment of the present disclosure.

FIG. 12 illustrates a sectional view of a display panel according to still another embodiment of the present disclosure, and the same configurations as described in the above embodiments are not repeated herein. The differences lie in that the accommodation portion 150 includes a sidewall 153 extending toward the first substrate 110, the sidewall 153 of the accommodation portion 150 includes a first end 153a, and the first end 153a is connected with an end of the first elastic wall 160 facing the second substrate 120. The first elastic wall 160 is made of either a light-transmitting material or a light-shading material, and the accommodation portion 150 is made of the other one of the light-transmitting material or the light-shading material. Optionally, the first elastic wall 160 is made of the light-transmitting material and the accommodation portion 150 is made of the light-shading material.

When touch happens, the accommodation proportion of the photosensitive portion in the accommodation portion changes so that light received by the photosensitive portion changes. The accommodation portion plays a role of amplifying the change of the light at a position where the photosensitive portion is located.

In addition, when touch happens, the first substrate and the second substrate will deform due to pressing, causing misalignment between the first substrate and the second substrate. In the present embodiment, the accommodation portion is connected with the first elastic wall so that the accommodation portion, the first elastic wall, and the photosensitive portion are correctly aligned, thereby improving stability of the detector.

Optionally, as shown in FIG. 12, the accommodation portion 150 further includes a bottom surface 154 connected with the sidewall 153, and the bottom surface 154 and the sidewall 153 forms the accommodation space 151. Each of the bottom surface 154 and the sidewall 153 is made of a light-shading material. The bottom surface 154 of the accommodation portion 150 is unconnected with the second substrate 150. When touch happens and the display panel is pressed, the first substrate and the second substrate deform and cause misalignment between the first substrate and the second substrate; however, in the present embodiment, the accommodation portion is only connected with the first elastic wall, which avoids misalignment of the accommodation portion with respect to the photosensitive portion on the first substrate due to being drawn by the second substrate. As such, it is achieved that the accommodation portion, the first elastic wall, and the photosensitive portion are correctly aligned while avoiding twisting and fracture of the first elastic wall caused by the misalignment between the first substrate and the second substrate, thereby improving reliability of the device. In addition, the accommodation portion, the first elastic wall, and the photosensitive portion can be made at the same side of one substrate, so as to simplify the making process.

Optionally, the bottom surface of the accommodation portion contacts the second substrate but is unconnected with the second substrate. As such, once touch happens, the first and second substrates do not have to deform to contact the accommodation portion, the correct alignment is ensured and no detection delay will happen, which improves the sensitivity of the detector.

Figure 13:
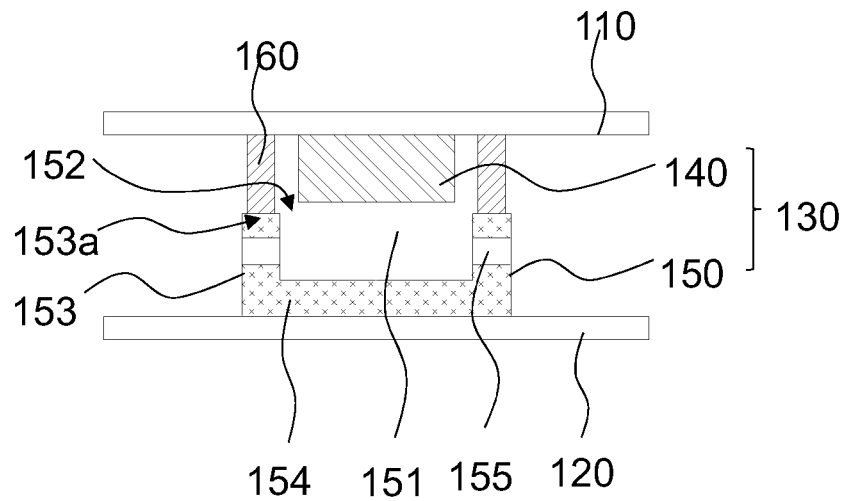
FIG. 13 illustrates a sectional view of a display panel according to still another embodiment of the present disclosure.

FIG. 13 illustrates a sectional view of a display panel according to still another embodiment of the present disclosure, and the same configuration as described in the above embodiments are not repeated herein. The differences lie in that the accommodation portion 150 is made of a light-transmitting material and the first elastic wall 160 is made of a light-shading material. The sidewall of the accommodation portion has at least one hollow portion 155, and the hollow portion 155 communicates the accommodation space in the accommodation portion with an exterior of the accommodation portion. The accommodation portion, the first elastic wall, and the first substrate define a closed space. When pressing happens, the closed space may decrease and lose balance with the external atmospheric pressure. However, the hollow portion communicates the closed space with the exterior of the accommodation portion and balances the pressure between the closed space and the exterior, which improves a service life of the device.

In some optional embodiments, the detector includes a first elastic wall surrounding the photosensitive portion and the first elastic wall extends along a direction perpendicular to the first substrate. The accommodation portion includes a sidewall extending toward the first substrate, the sidewall of the accommodation portion includes a first end, and the first end is connected with an end of the first elastic wall facing the second substrate. The first elastic wall is unconnected with the first substrate. That is to say, the first elastic wall is arranged on the first end of the sidewall of the accommodation portion, so that the first elastic wall plays a buffer role and misalignment between the first elastic wall and the accommodation portion can be avoided.

Figure 14:
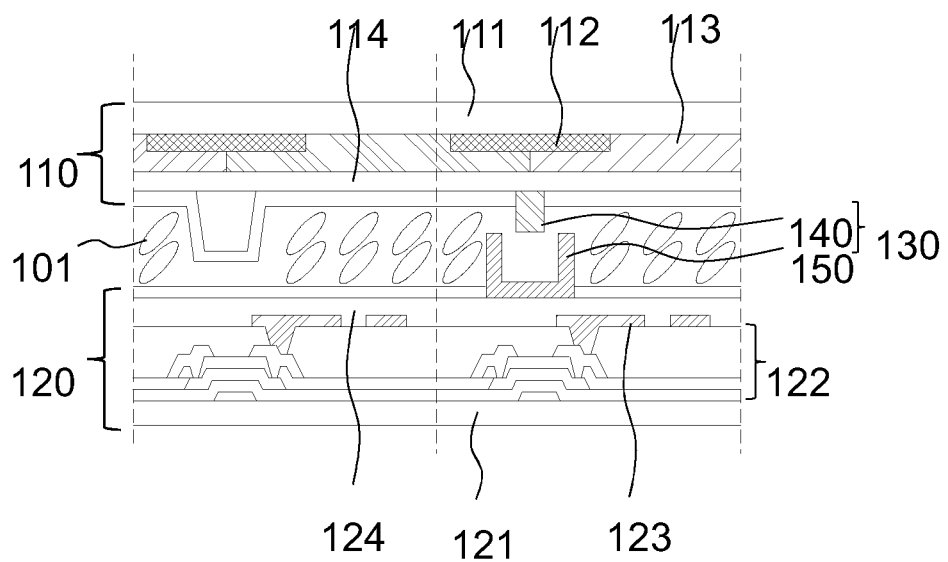
FIG. 14 illustrates a sectional view of a display panel according to still another embodiment of the present disclosure.

FIG. 14 illustrates a sectional view of a display panel according to still another embodiment of the present disclosure, and the same configurations in the present embodiment as those in the above embodiments are not repeated herein.

The differences lie in that the first substrate 110 is a color film substrate and the second substrate 120 is an array substrate.

The color film substrate (the first substrate) 110 is arranged opposite to the array substrate (the second substrate) 120 and are sealed by a sealant (not shown in the figures), so as to form a sealed area. The detector 130 is placed between the color film substrate 110 and the array substrate 120 and is located in the sealed area, and a liquid crystal 101 is filled in the sealed area.

The color film substrate (the first substrate) 110 includes a first base substrate 111, a black matrix layer 112, a color light-filtering layer 113, and the first planarization layer 114. The black matrix layer 112, the color light-filtering layer 113, and the first planarization layer 114 are placed in order on a side of the first base substrate 111 facing the array substrate. The array substrate (the second substrate) 120 includes the second base substrate 121, a thin film transistor layer 122, a pixel electrode layer 123 and a second planarization layer 124, and the thin film transistor layer 122, the pixel electrode layer 123, and the second planarization layer 124 are placed in order at a side of the second substrate 121 facing the color film substrate. Other conventional film structures contained in the color film substrate 110 and the array substrate 120 are not repeated herein.

Optionally, the photosensitive portion 140 is placed on the first planarization layer 114 and the accommodation portion 150 is placed on the second planarization layer 124. That is to say, the photosensitive portion 140 is located on the color film substrate 110 and the accommodation portion 150 is located on the array substrate 120.

Optionally, when the accommodation portion is made of a transparent material (as described in the above embodiment), in the present embodiment, the accommodation portion can be made in the same layer where the planarization layer in the array substrate or the color film substrate is located, so as to simplify the making process and save the cost.

Optionally, an orthographic projection of the detector 130 toward the color film substrate 110 falls into a coverage range of the black matrix layer 112. The black matrix layer 112 can shade the detector 130 to a certain extent while not reducing an aperture ratio of the pixels of the display panel, so as to avoid influence of external unstable environment light on the detection results. FIG. 14 shows a situation in which the detector is placed in a liquid crystal box. However, it should be understood that, in some optional embodiments, the detector may not be located in the liquid crystal box, as long as the orthographic projection of the detector toward the color film substrate falls into the coverage range of the black matrix layer.

In the present embodiment, in the non-touch state, the accommodation portion plays a role of accommodating the photosensitive portion and the accommodation portion plays a role of amplifying the change of the light at a position where the photosensitive portion is located, which improves detection accuracy and sensitivity of the detector.

Meanwhile, since the detector is arranged in the liquid crystal box, the detection preciseness is improved, the making process is simplified, a box thickness of the display panel is reduced, and a step of aligning the substrate supporting the detector with other substrate or film layers in the display panel is eliminated.

In addition, the light received by the photosensitive portion mainly comes from a light source in the display panel, that is, a backlight source in the liquid crystal display panel provides light, and the light provided by the backlight source is more stable than the environment light, which avoids adverse influence of the environment light on the detection results and allows more accurate detection results.

Figure 15:
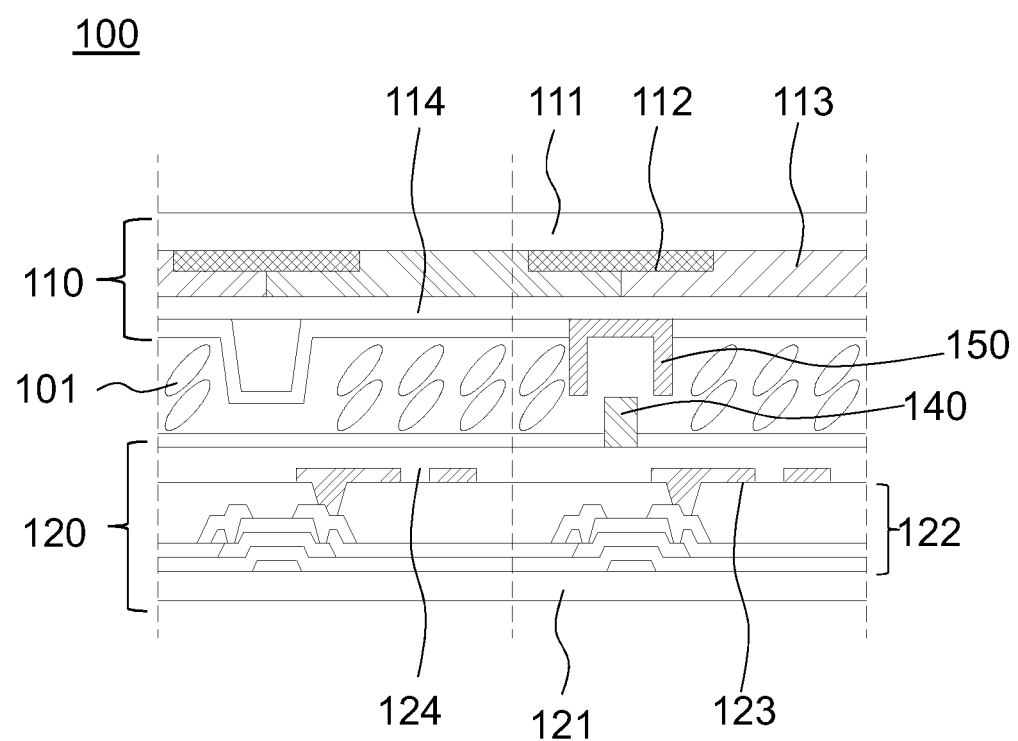
FIG. 15 illustrates a sectional view of a display panel according to still another embodiment of the present disclosure.

FIG. 15 illustrates a sectional view of a display panel according to still another embodiment of the present disclosure, and the same configurations in the present embodiment as those in the above embodiments are not repeated herein.

The differences lie in that the first substrate 110 is an array substrate and the second substrate 120 is a color film substrate. The accommodation portion 150 is placed on the first planarization layer 114 and the photosensitive portion 140 is placed on the second planarization layer 124, that is to say, the accommodation portion 150 is located on the color film substrate 110 and the photosensitive portion 140 is located on the array substrate 120.

Optionally, the accommodation portion 150 is made of a light-shading material. Accordingly, since the accommodation portion 150 is located at a side of the photosensitive portion 140 close to external environment light, even if no touch happens, the accommodation portion 150 will shade the photosensitive portion 140 to a certain extent, thereby avoiding misinformation of touch due to change of the resistance value of the photosensitive portion 140 when there appears unstable external environment light or when there appears an object which gets close to the display panel, shades the display panel but does not touch the display panel.

In some optional embodiments, the display panel includes a plurality of detectors, and the photosensitive portions of at least two different detectors are located at different substrates.

Figure 16:
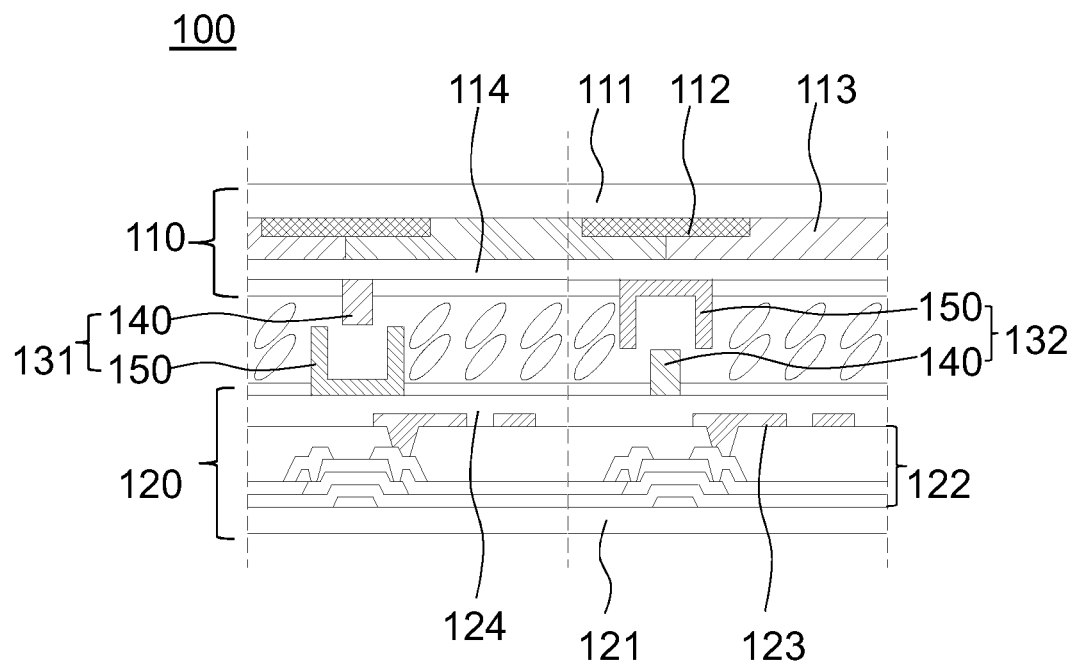
FIG. 16 illustrates a sectional view of a display panel according to still another embodiment of the present disclosure.

FIG. 16 illustrates a sectional view of a display panel according to still another embodiment of the present disclosure, and the same configurations in the present embodiment as those in the above embodiments are not repeated herein. As shown in FIG. 16, the display panel 100 includes a plurality of first detectors 131 and a plurality of second detector 132. The photosensitive portions 140 of the first detectors 131 are located on the color film substrate 110 and the photosensitive portions 140 of the second detectors 132 are located at the array substrate 120.

Optionally, the first detectors are arranged in an array, and the photosensitive portions of the first detectors in the same row (in direction x) are connected together by a metallic wiring. The second detectors are arranged in an array, and the photosensitive portions of the second detectors in the same column (in direction y) are connected together by a metallic wiring. The wirings extending out of the panel is connected with a specific controller (control IC) via a flexible printed circuit (FPC). Change of the sensing signals of the photosensitive portions in each row and change of the sensing signals of the photosensitive portions in each column are calculated respectively to determine coordinates (x, y), thereby determining the touch point. Therefore, the wirings on a single side of the substrate are simplified and crosstalk between the wirings is avoided.

It should be understood that the implementation that the detectors are arranged between the array substrate and the color film substrate is merely one example, and during real practice, the detectors may be not limited to be between the array substrate and the color film substrate.

Figure 17:
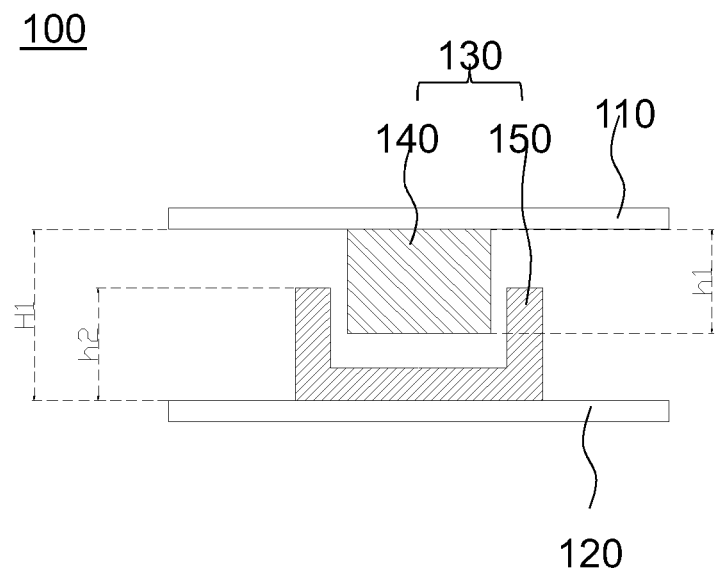
FIG. 17 illustrates a sectional view of a display panel in a non-touch state according to still another embodiment of the present disclosure.

FIG. 17 illustrates a sectional view of a display panel in a non-touch state according to still another embodiment of the present disclosure, and the same configurations in the present embodiment as those in the above embodiments are not repeated herein. As shown in FIG. 17, along a direction perpendicular to the display panel 100, the photosensitive portion 140 has a first height h1 and the accommodation portion 150 has a second height h2. In the non-touch state, a distance between the first substrate 110 and the second substrate 120 is defined as a first thickness H1.

A sum of the first height h1 and the second height h2 is greater than or equal to the first thickness H1. That is to say, in the non-touch state, the photosensitive portion is in a critical state between being at least partially accommodated in the accommodation space and being completely accommodated in the accommodation space; or, in the non-touch state, the photosensitive portion is in a state of being at least partially accommodated in the accommodation space. As such, the proportion of the photosensitive portion accommodated in the accommodation portion changes immediately when touch happens, without requiring that the first and second substrates deform to some extent, so that detection delay is avoided and the detection sensitivity of the detector is improved.

In some optional embodiments, the first elastic wall in a natural state (not compressed by the accommodation portion) has a third height. It can be understood that a sum of the second height and the third height is less than or equal to the first thickness. In an optional embodiment, when the accommodation portion is made of a light-transmitting material and the first elastic wall is made of a light-shading material, the third height is equal to the first height, and a sum of the second height and the third height is equal to the first thickness. As such, once touch happens, deformation of the first and second substrates is unnecessary for realizing that the accommodation proportion of the photosensitive portion in the accommodation portion changes, so that detection delay is avoided and the detection sensitivity of the detector is improved.

In some optional embodiments, the detector is located in a liquid crystal box. Optionally, the accommodation portion and/or the photosensitive portion can replace a part of the support posts and play a role of supporting the array substrate and the color film substrate, thereby maintaining the thickness of the liquid crystal box. If an allowable minimum distance between the array substrate and the color film substrate is Y, a height of the accommodation portion and/or the photosensitive portion along a direction perpendicular to the display panel (i.e., the above-mentioned second height h2 and/or second height h1) is greater than Y Besides, if the accommodation portion includes the bottom surface and a thickness of the bottom surface along the direction perpendicular to the display panel is X, a height of the photosensitive portion along the direction perpendicular to the display panel will be greater than (Y−X). About the allowable minimum distance Y between the array substrate and the color film substrate: when the display panel is not pressed, the distance between the array substrate and the color film substrate is 3.2 µm (in an allowable error range). A main support post and an auxiliary support post are arranged between the array substrate and the color film substrate, a height of the main support post is generally equal to a distance of 3.2 µm between the array substrate and the color film substrate, or the height of the main support post is less than a distance of 0.3~0.4 µm between the array substrate and the color film substrate. The auxiliary support post determines the minimum distance between the array substrate and the color film substrate, and the height of the auxiliary support post is 0.5~0.6 µm less than the height of the main support post. The allowable minimum distance Y between the array substrate and the color film substrate is (3.2−0.4−0.6)µm=2.2 µm. That is to say, the second height h2 and/or the second height h1 is greater than or equal to 2.2 µm.

Figure 18:
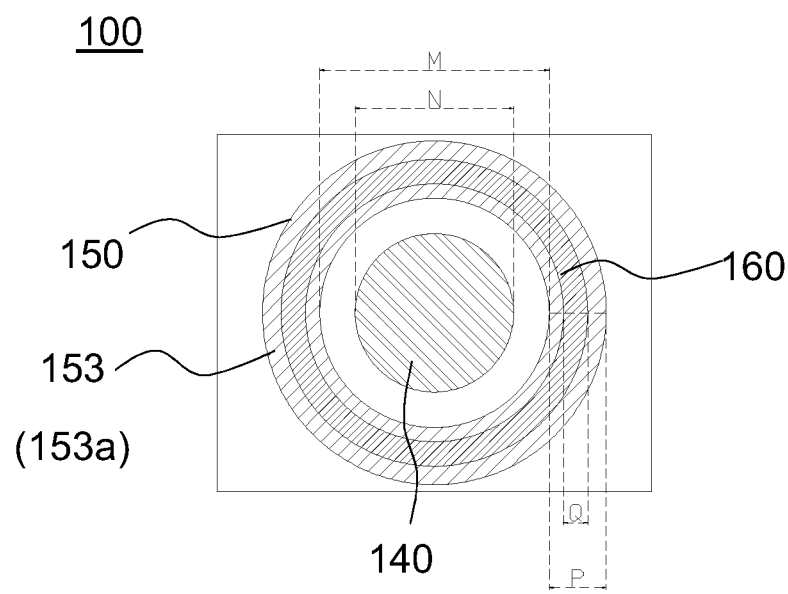
FIG. 18 illustrates a partial schematic top view of a display panel according to still another embodiment of the present disclosure.

FIG. 18 illustrates a partial schematic top view of a display panel according to still another embodiment of the present disclosure. As shown in FIG. 18, as an example, an orthographic projection of the photosensitive portion on the first substrate is circular and an orthographic projection of the accommodation portion on the first substrate is shaped like a ring. It can be understandable that a detector in other shape is also applicable for the following solutions.

Optionally, the orthographic projection of the sidewall 153 on the first substrate 110 circumferentially surrounds the photosensitive portion 140. From a top view of the display panel, the sidewall 153 circumferentially surrounds the photosensitive portion 140. Due to process limitations during alignment, there may be a certain alignment error. Optionally, a size M of the opening of the accommodation portion is a certain value greater than a size N of the photosensitive portion, and the value is no less than 4.5 µm, i.e., M−N≥4.5 µm. Herein, "size" may refer to width, length or diameter of the related object. That is to say, when a center of the accommodation portion is aligned to a center of the accommodation portion, an extension size of the opening of the accommodation portion beyond the photosensitive portion is greater than or equal to ½*4.5 µm, so as to provide reserved space for an alignment error between the accommodation portion and the photosensitive portion for improving alignment accuracy. It is merely exemplary that an orthographic projection of the photosensitive portion on the first substrate is circular and an orthographic projection of the accommodation portion on the first substrate is shaped like a ring. It can be understandable that a detector in another shape has the same principles as above.

Optionally, an orthographic projection of the first elastic wall 160 on the first substrate falls into an orthographic projection of the first end 153a of the sidewall 153 on the first substrate. Optionally, a width P of the orthographic projection of the first end 153a on the first substrate is a certain value greater than a width Q of the orthographic projection of the first elastic wall 160 on the first substrate, and the value is no less than 4.5 µm, i.e., P−Q≥4.5 µm, so as to provide a preserved space for an alignment error between the accommodation portion and the first elastic wall for improving alignment accuracy.

Figure 19:
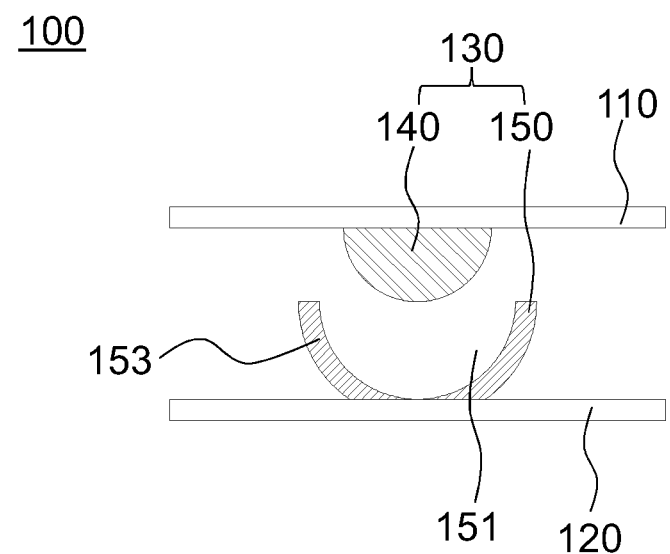
FIG. 19 illustrates a sectional view of a display panel according to still another embodiment of the present disclosure.

In some optional embodiments, an external surface and an internal surface of the accommodation portion 150 are cambered surfaces, and the accommodation space 151 is approximately hemispherical, as shown in FIG. 19, which illustrates a sectional view of a display panel according to still another embodiment of the present disclosure.

Figure 20:
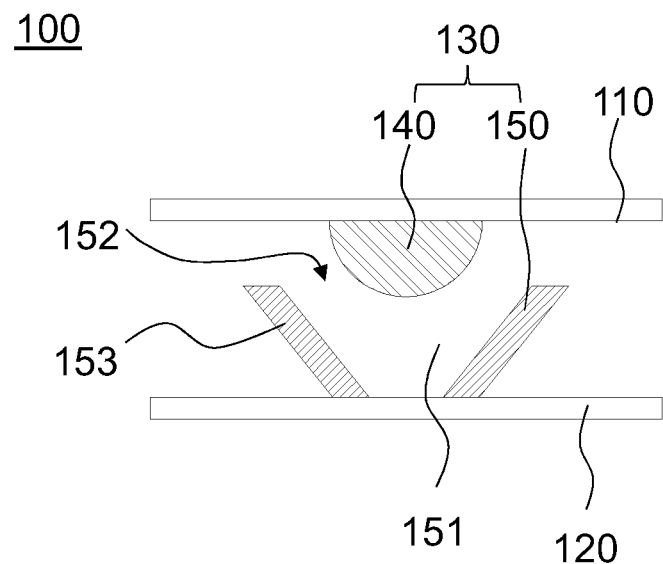
FIG. 20 illustrates a sectional view of a display panel according to still another embodiment of the present disclosure.

In some optional embodiments, the sidewall 153 of the accommodation portion 150 extends along a direction from the second substrate 120 toward the first substrate 110 and inclines away from the photosensitive portion 140, as shown in FIG. 20, which illustrates a sectional view of a display panel according to still another embodiment of the present disclosure. Thus, the opening 152 is relatively big while the accommodation portion 150 does not occupy too much space, thereby improving alignment accuracy.

Figure 21:
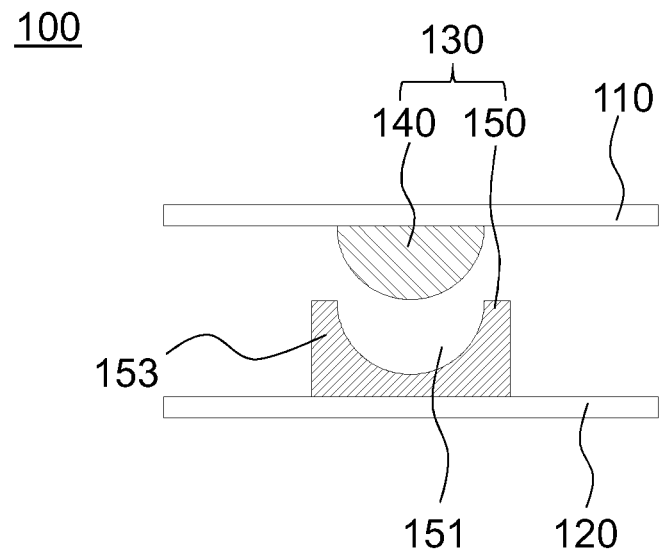
FIG. 21 illustrates a sectional view of a display panel according to still another embodiment of the present disclosure.

In some optional embodiments, the external surface and the internal surface of the accommodation portion 150 can be in other shapes as shown in FIG. 21, which illustrates a sectional view of a display panel according to still another embodiment of the present disclosure, the internal surface of the accommodation portion 150 is a hemispherical surface and the accommodation space 151 is correspondingly hemispherical so as to be matched with an outer shape of the photosensitive portion 140 so that the accommodation portion 150 can be a perfect fit to the photosensitive portion 140 when touch happens. An external surface of the accommodation portion 150 is shaped as a side surface of a column, thereby simplifying the making process.

In some optional embodiments, the external surface and/or the internal surface of the accommodation portion can be shaped as a surface(s) selected from a group consisting of hemispherical surface, hemi-ellipsoidal surface, cambered surface, overlay surface, conical surface and combinations thereof. For example, the internal surface of the accommodation portion is a conical side surface so that the accommodation space is conical, and the external surface of the accommodation portion is a hemispherical surface.

In some optional embodiments, the photosensitive portion is designed as a hemisphere, a cylinder with an axis perpendicular to the display panel, a cone with an axis perpendicular to the display panel or other rotation body, so that the photosensitive portion has a curved surface and thus can receive light incident from various directions, thereby improving detection sensitivity and accuracy.

In some optional embodiments, the photosensitive portion is designed as a triangular prism or a quadrangular prism extending in a direction perpendicular to the place where the display panel is located. That is to say, the orthographic projection of the photosensitive portion in the plane where the display panel is located is triangular or quadrilateral. In a condition that the photosensitive portion has the same height and the photosensitive portion occupies the same area, the photosensitive portion shaped as the triangular prism or the quadrangular prism will have a larger light-sensing surface (surface area), allowing more sensitive detection. In turn, for the photosensitive portions with an identical light-sensing surface (i.e., surface area), the photosensitive portion shaped as the triangular prism or the quadrangular prism will save more space, good for improving an aperture ratio of the display panel.

Figure 22:
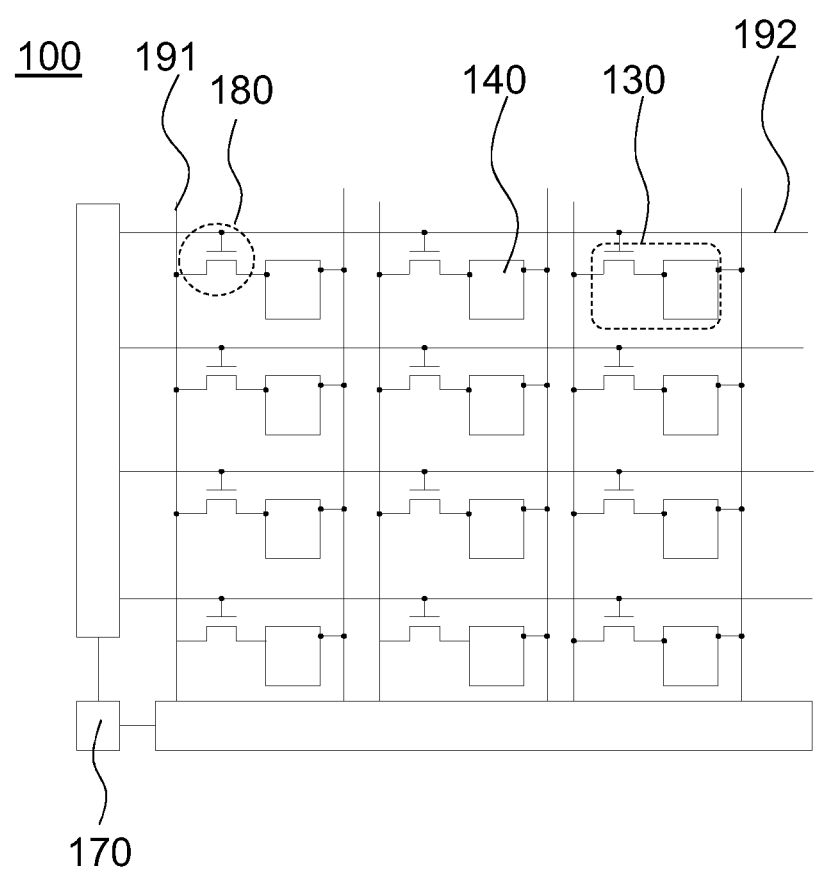
FIG. 22 illustrates a partial schematic top view of a display panel according to still another embodiment of the present disclosure.

FIG. 22 illustrates a partial schematic top view of a display panel according to still another embodiment of the present disclosure. As shown in FIG. 22, the display panel further includes a controller 170, and the controller 170 is electrically connected with the detector 130 by a wiring. The controller 170 is used for providing an input signal for the detector 130, receiving an output signal from the detector 130, and determining a touch position according to the output signal provided by the detector 130. The detector 130 further includes a switch unit 180 and the switch unit 180 is connected with the photosensitive portion 140 for control turning-on of the photosensitive portion 140. Optionally, the switch unit is a thin film transistor, the thin film transistor is connected between the second signal line and the photosensitive portion by the source electrode and the drain electrode of the thin film transistor, and the gate electrode of the thin film transistor is connected with the first signal line.

The display panel further includes a plurality of first signal lines 191 and a plurality of second signal lines 192, the first signal lines 191 and the second signal lines 192 intersect with and are insulated from one another to define a plurality of detectors 130 arranged in a matrix. The first signal lines 191 are used for transmitting switching signals for controlling on-off state of the switch unit 180, so that the switch unit 180 controls whether the photosensitive portion 140 can receives a signal; the second signal lines 192 are used for transmitting driving signals.

During a one-frame cycle, the controller provides a switching signal to the first signal lines to turn on the photosensitive portions, and simultaneously a driving signal to the photosensitive portions via the second signal lines. Then, the controller receives sensing signals output by the photosensitive portions of the detectors. The sensing signals in a touch state are different from the sensing signal in a non-touch state (see the embodiments above), and the controller determines whether touch happens at positions where the corresponding detectors are located according to change of the sensing signals.

Figure 23:
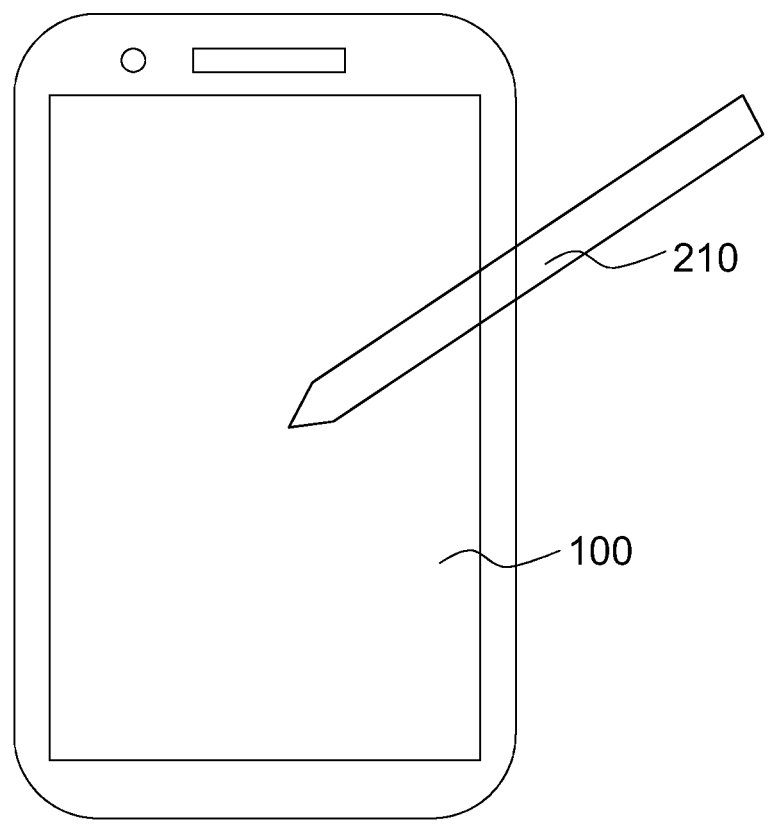
FIG. 23 illustrates a schematic view of a display device according to still another embodiment of the present disclosure.

The present disclosure further provides a display device. FIG. 23 illustrates a schematic view of a display device according to still another embodiment of the present disclosure. As shown in FIG. 23, the display device 200 includes the display panel 100 as described in any embodiment above, and the display device can be a cell phone, a tablet PC, a wearable device, etc. It can be understandable that the display device 200 may further include a drive chip, a glass cover, or other conventional structure, which are not repeated herein. Optionally, the display device 200 may further include a touch means 210 used together with the display panel 100 provided in any of the above embodiments, and the touch means can be a writing tool such as a touch pen or a card or the like, in a similar shape. Optionally, the touch means 210 is made of a transparent material, for example, glass or plastics, so that the display will not be shaded when a user conducts a touch operation, especially when the user needs to click some small icons, the icons to be clicked will not be shaded and the user can check whether the clicked icon is right or wrong, thereby avoiding incorrect operation.

It can be known from the above embodiments that the display panels and the display device achieve at least the following beneficial effects: when the user is conducting a touch operation, the pressing force during the touch changes the distance between the first substrate and the second substrate so that the accommodation proportion of the photosensitive portion in the accommodation portion changes and thus light received by the photosensitive portion changes. The accommodation portion plays a role of amplifying the change of the light at a position where the photosensitive portion is located, which improves the detection sensitivity of the detector.

The above are detailed descriptions of the present disclosure with reference to the specific optional embodiments. The present disclosure is not limited to these embodiments, those skilled in the art can still make deductions or substitutions to these embodiments without departing from the invention concept of the present disclosure, and all these deduction and substitutions shall fall into the protection scope of the present disclosure.

What is claimed is:

1. A display panel, comprising:
   a first substrate,
   a second substrate placed opposite to the first substrate, and
   at least one detector placed between the first substrate and the second substrate, wherein each of the at least one detector comprises a photosensitive portion and an accommodation portion, wherein the photosensitive portion is located at a side of the first substrate facing the second substrate, the accommodation portion is located between the photosensitive portion and the second substrate, and the accommodation portion comprises an accommodation space and an opening facing the photosensitive portion; wherein
   in an instance in which the distance between the first substrate and the second substrate changes, a proportion of the photosensitive portion accommodated in the accommodation portion changes so that light received by the photosensitive portion changes; and in an instance in which the photosensitive portion senses a change of the received light, a resistance value of the photosensitive portion changes, and the photosensitive portion outputs a different sensing signal.

2. The display panel according to claim 1, wherein the display panel has a first state and a second state;

wherein in the first state, a minimum distance between the accommodation portion and the first substrate is defined as a first distance, the photosensitive portion is at least partially located outside the accommodation space, and the resistance value of the photosensitive portion is defined as a first resistance value;

wherein in the second state, a minimum distance between the accommodation portion and the first substrate is defined as a second distance, the photosensitive portion is accommodated in the accommodation space, and the resistance value of the photosensitive portion is defined as a second resistance value;

wherein the first distance is greater than the second distance, and the first resistance value is different from the second resistance value.

3. The display panel according to claim 1, wherein the accommodation portion comprises a sidewall extending toward the first substrate, and an orthographic projection of the sidewall on the first substrate surrounds the photosensitive portion.

4. The display panel according to claim 3, wherein the accommodation portion is placed on a surface of the second substrate, and the second substrate and the sidewall cooperatively form the accommodation space.

5. The display panel according to claim 3, wherein the accommodation portion further comprises a bottom surface connected with the sidewall, and the bottom surface and the sidewall cooperatively form the accommodation space.

6. The display panel according to claim 5, wherein the accommodation portion is placed on a surface of the second substrate.

7. The display panel according to claim 4, wherein the accommodation portion is made of a light-shading material.

8. The display panel according to claim 5, wherein the accommodation portion is made of a light-shading material.

9. The display panel according to claim 3, wherein the detector further comprises a first elastic wall, and the first elastic wall is placed at the side of the first substrate facing the second substrate and surrounds the photosensitive portion; the sidewall comprises a first end facing the first substrate, an orthographic projection of the first end of the sidewall on the first substrate overlaps with an orthographic projection of the first elastic wall on the first substrate; and with a change of the distance between the first substrate and the second substrate, the sidewall compresses the first elastic wall and changes the proportion of the photosensitive portion accommodated in the accommodation portion, so that light at a position where the photosensitive portion is located changes; and wherein the accommodation portion is made of a light-transmitting material and the first elastic wall is made of an elastic light-shading material; or the accommodation portion is made of a light-shading material and the first elastic wall is made of an elastic light-transmitting material.

10. The display panel according to claim 9, wherein the first end of the sidewall is connected with an end of the first elastic wall facing the second substrate.

11. The display panel according to claim 1, wherein an external surface and/or an internal surface of the accommodation portion is shaped as a hemispherical surface, a hemi-ellipsoidal surface, a cambered surface, an overlay surface, or a conical surface.

12. The display panel according to claim 1, wherein the photosensitive portion is a photosensitive resistor.

13. The display panel according to claim 12, wherein the photosensitive resistor comprises amorphous silicon.

14. The display panel according to claim 1, wherein the first substrate is a color film substrate and the second substrate is an array substrate; or the first substrate is an array substrate and the second substrate is a color film substrate.

15. The display panel according to claim 14, wherein the color film substrate comprises a first base substrate, a black matrix layer, a color light-filtering layer and a first planarization layer, and the black matrix layer, the color light-filtering layer and the first planarization layer are placed in order on a side of the first base substrate facing the array substrate;

the array substrate comprises a second base substrate, a thin film transistor layer, a pixel electrode layer and a second planarization layer, and the thin film transistor layer, the pixel electrode layer and the second planarization layer are placed in order at a side of the second base substrate facing the color film substrate; and the photosensitive portion or the accommodation portion is placed on the first planarization layer or the second planarization layer.

16. The display panel according to claim 14, wherein an orthographic projection of the at least one detector toward the color film substrate falls into a coverage scope of the black matrix layer.

17. The display panel according to claim 1, wherein each of the at least one detector further comprises a switch unit, and the switch unit is connected with the photosensitive portion to control turning-on of the photosensitive portion.

18. The display panel according to claim 17, further comprising:

a plurality of first signal lines for transmitting a switching signal, and a plurality of second signal lines for transmitting a driving signal, wherein the plurality of first signal lines and the plurality of second signal lines intersect with and are insulated from one another to define a plurality of detectors arranged in a matrix; and the switch unit is a thin film transistor connected between the second signal lines and the photosensitive portion by a source electrode and a drain electrode of the thin film transistor, and a gate electrode of the thin film transistor is connected with the first signal line.

19. The display panel according to claim 1, further comprising a controller for providing an input signal to the at least one detector, receiving an output signal of the at least one detector, and determining a touch position according to the output signal provided by the at least one detector.

20. A display device, comprising a display panel, wherein the display panel comprises:

a first substrate, a second substrate placed opposite to the first substrate, and at least one detector placed between the first substrate and the second substrate, wherein each of the at least one detector comprises a photosensitive portion and an accommodation portion, wherein the photosensitive portion is located at a side of the first substrate facing the second substrate, the accommodation portion being located between the photosensitive portion and the second substrate, and the accommodation portion comprises an accommodation space and an opening facing the photosensitive portion; wherein in an instance in which the distance between the first substrate and the second substrate changes, a proportion of the photosensitive portion accommodated in the accommodation portion changes so that light received by the photosensitive portion changes;

in an instance in which the photosensitive portion senses a change of the received light, a resistance value of the photosensitive portion changes, and the photosensitive portion outputs a different sensing signal.

* * * * *